INVENTOR.
MAURITS TEN BOSCH
JOSEPH F. KISHEL
BY
ATTORNEY

Aug. 9, 1966  M. TEN BOSCH ET AL  3,264,876
ALTITUDE AND VERTICAL VELOCITY METER
Filed Nov. 29, 1955  11 Sheets-Sheet 3
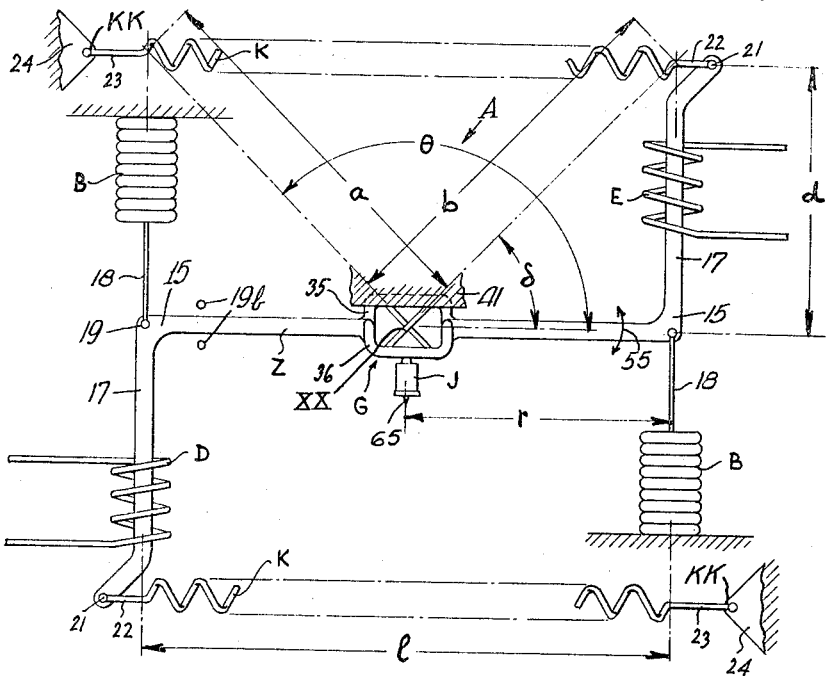
FIG. 5.
FIG. 4.
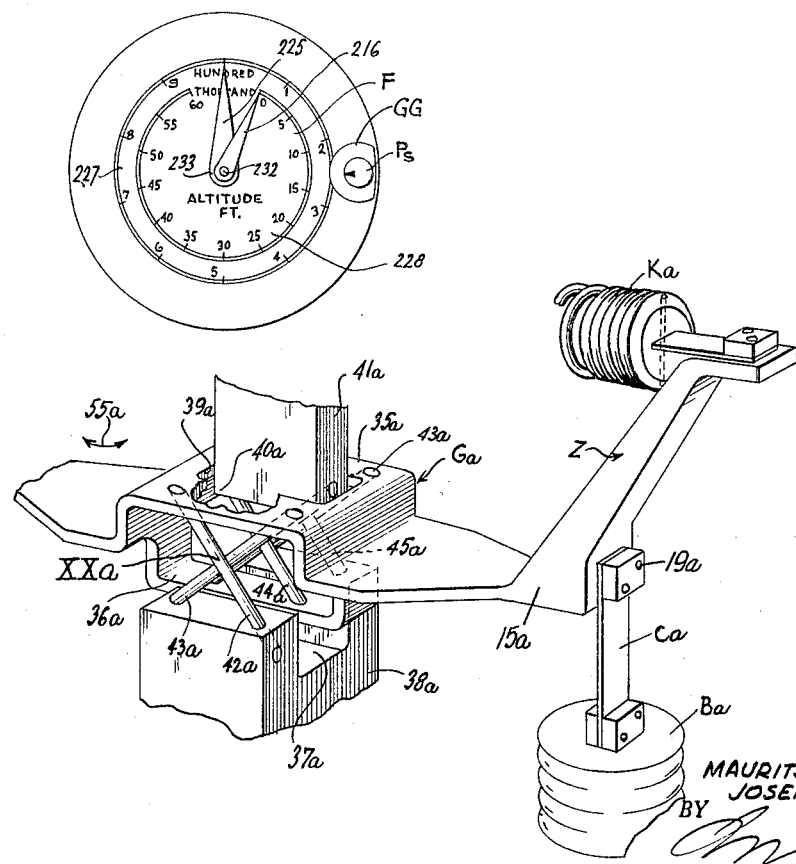
FIG. 6.
INVENTOR.
MAURITS TEN BOSCH
JOSEPH F. KISHEL
BY
ATTORNEY Aug. 9, 1966 M. TEN BOSCH ETAL 3,264,876
ALTITUDE AND VERTICAL VELOCITY METER
Filed Nov. 29, 1955 11 Sheets-Sheet 4

INVENTOR.
MAURITS TEN BOSCH
JOSEPH F. KISHEL
BY
ATTORNEY

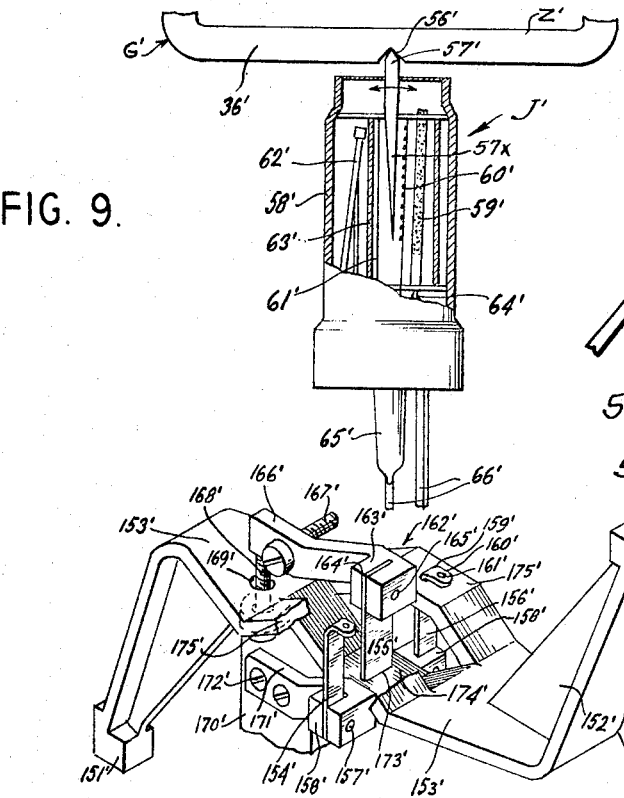
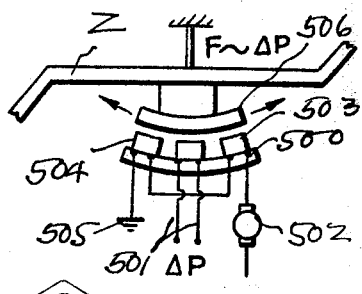
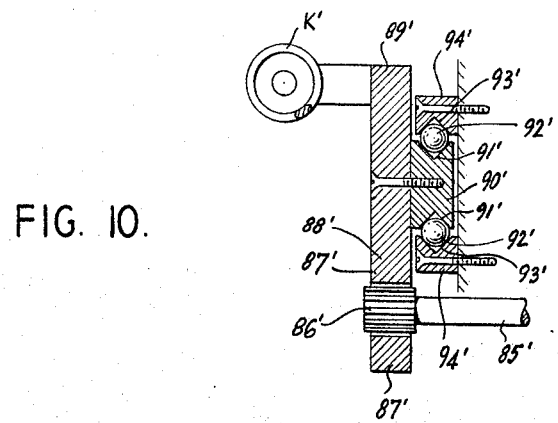

Aug. 9, 1966
M. TEN BOSCH ETAL
3,264,876
ALTITUDE AND VERTICAL VELOCITY METER
Filed Nov. 29, 1955
11 Sheets-Sheet 6
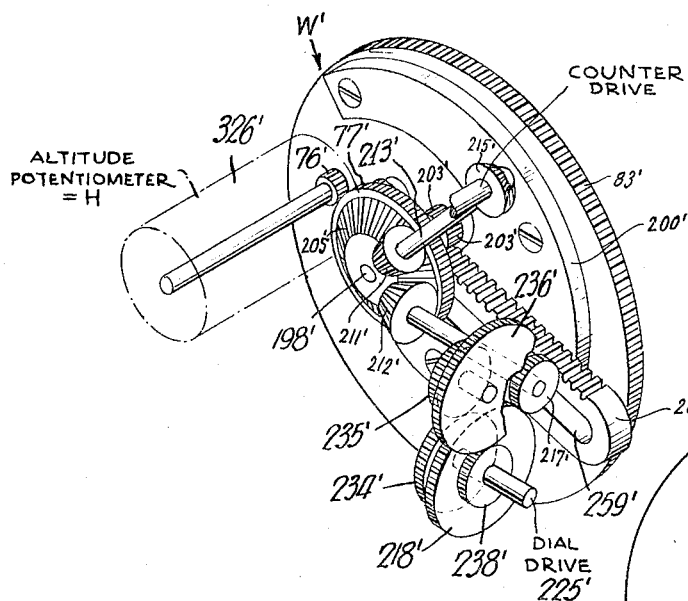
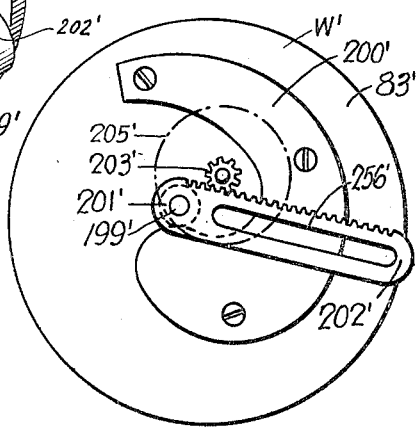
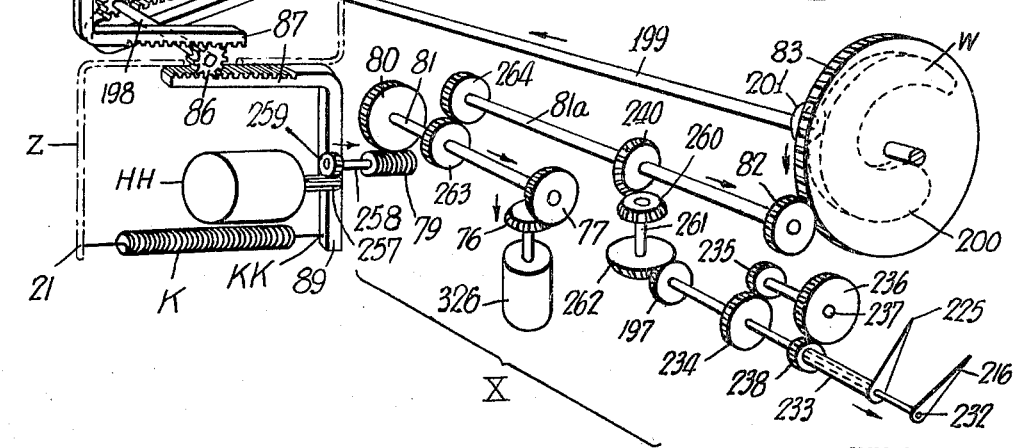
INVENTOR.
MAURITS TEN BOSCH
BY JOSEPH F. KISHEL
ATTORNEY

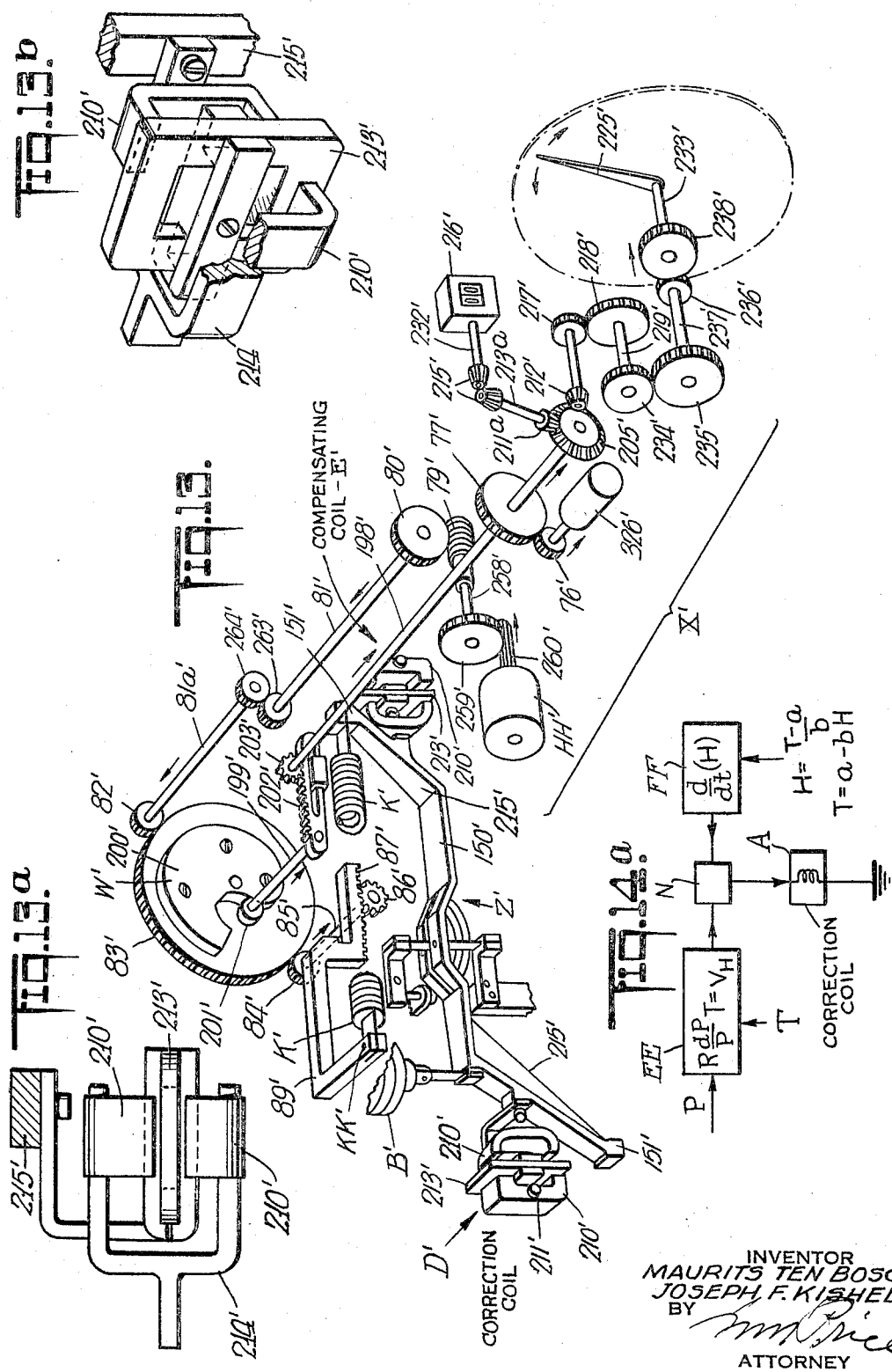

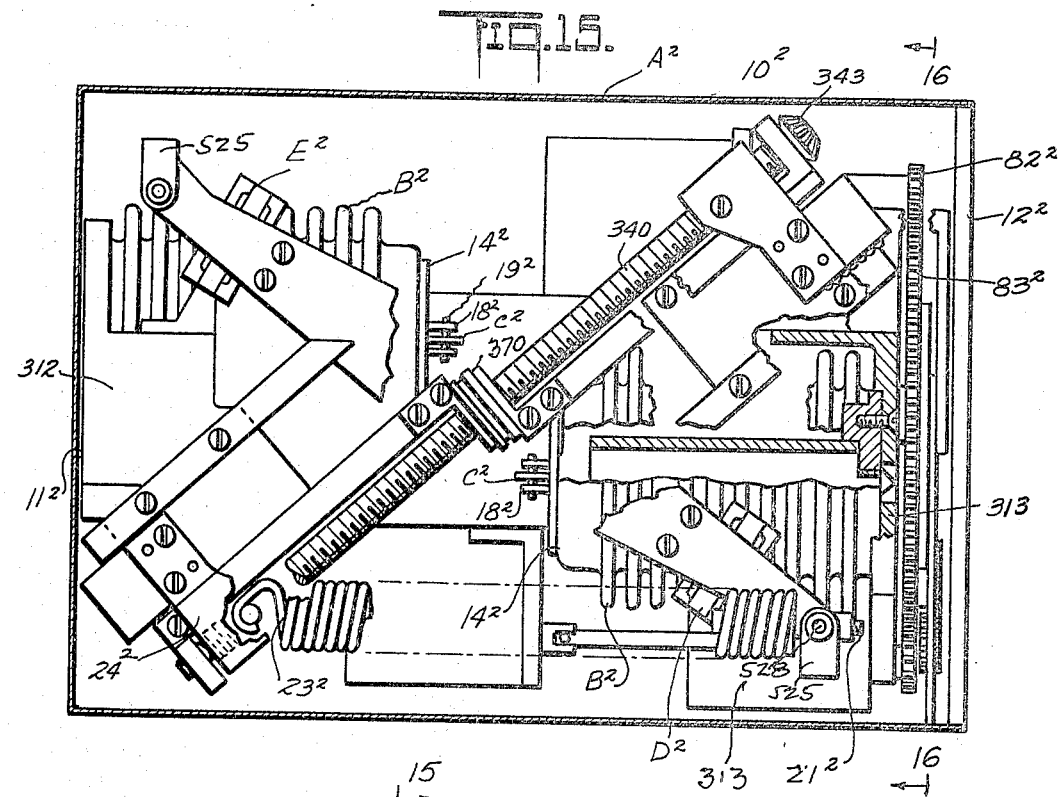
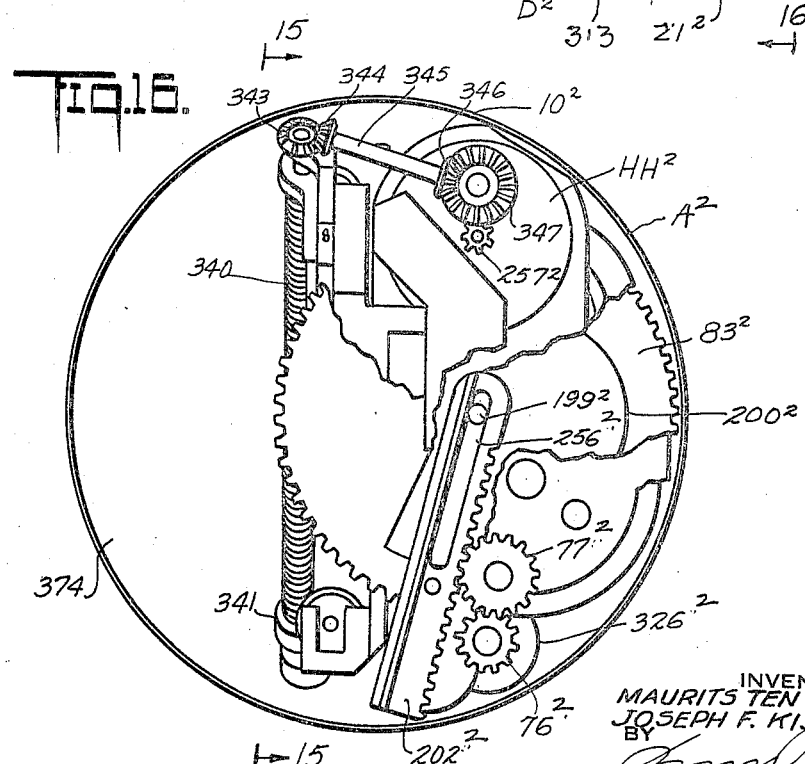

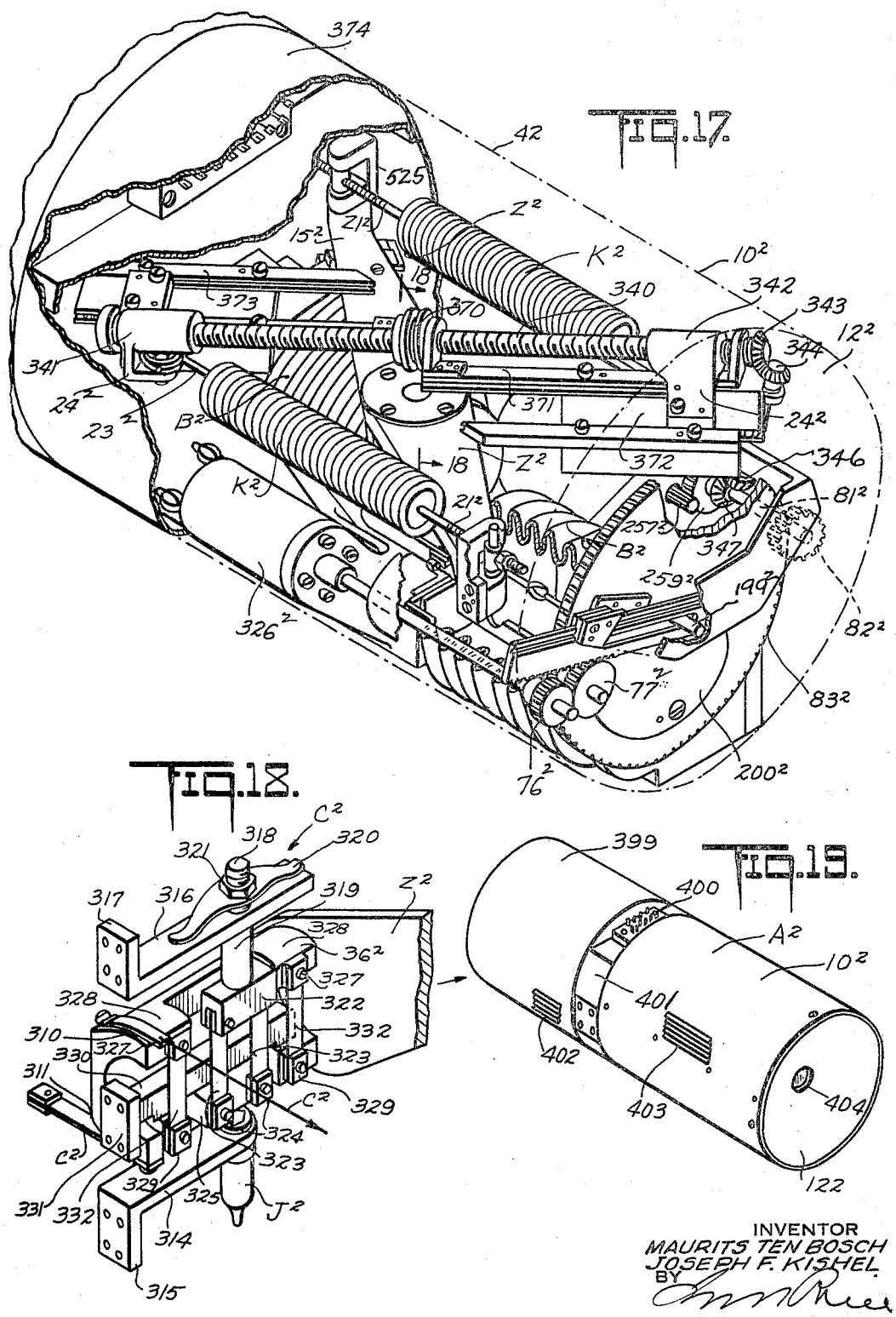

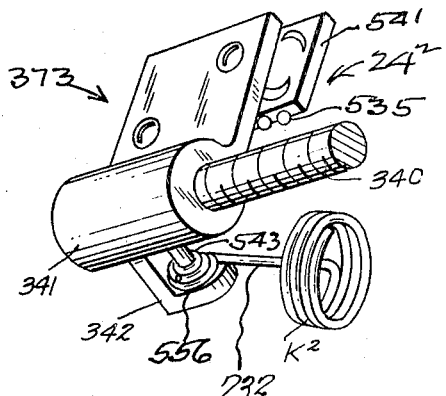
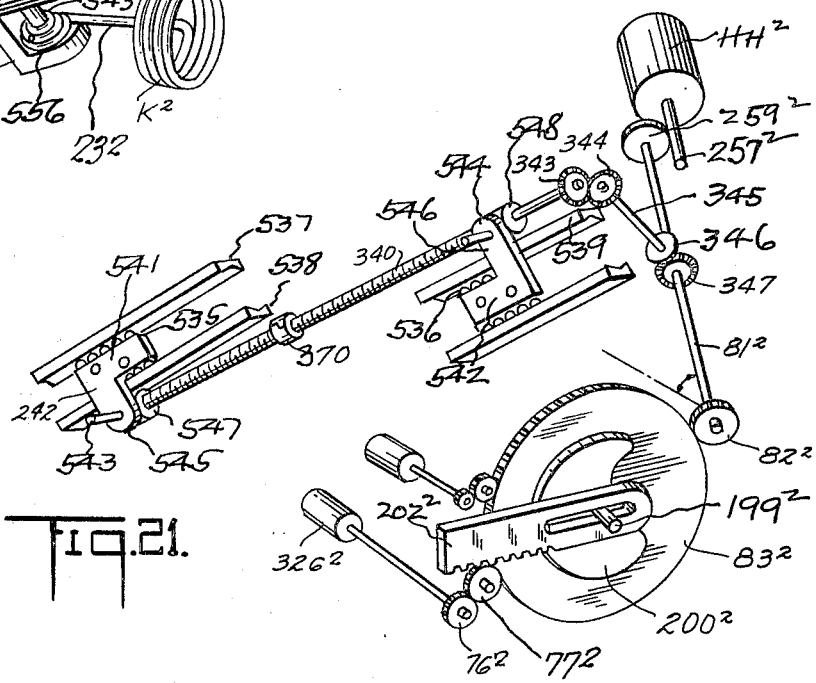
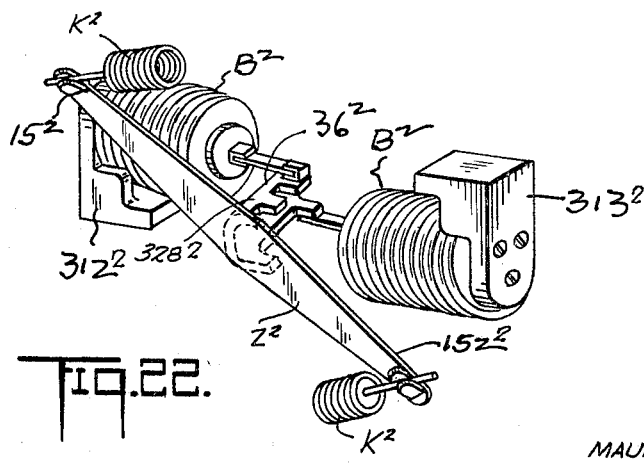
Fig. 20.
Fig. 21.
Fig. 22.
INVENTOR.
MAURITS TEN BOSCH
JOSEPH F. KISHEL
BY
ATTORNEY

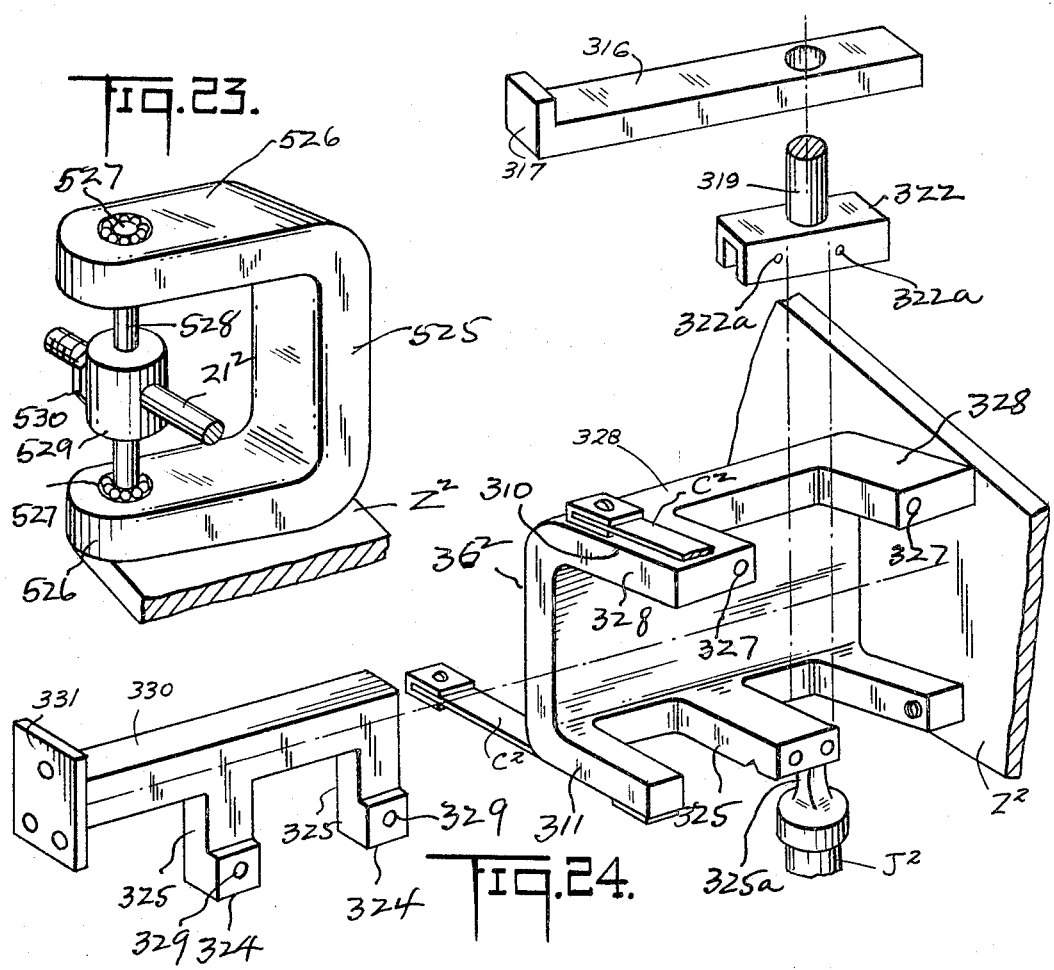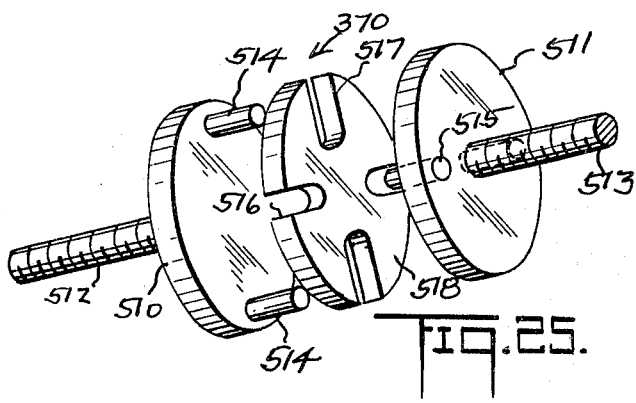

United States Patent Office 3,264,876
Patented August 9, 1966

3,264,876
ALTITUDE AND VERTICAL VELOCITY METER
Maurits ten Bosch, White Plains, and Joseph F. Kishel, Pleasantville, N.Y., assignors to M. ten Bosch, Inc., New York, N.Y., a corporation of New York
Filed Nov. 29, 1955, Ser. No. 549,766
1 Claim. (Cl. 73—386)

The present invention relates to an altitude metering system, and it particularly relates to an altimeter which may be used for measuring the altitude of aircraft above the surface of the earth.

It is among the objects of the present invention to provide a small, compact, durable, rugged, and highly sensitive altimeter, particularly designed for high-speed aircraft, and particularly adaptable to jet-propelled aircraft, which will be reliable at all altitudes and latitudes, which will have a minimum of moving parts, and which will be compact and provide maximum space economy.

Another object is to provide a reliable, rugged, highly sensitive altimeter for use on jet-propelled aircraft, which will have high accuracy over a very wide range of temperatures, altitudes, speeds and latitudes, and which may be readily replaced and serviced, and which will give a direct reading of the altitude as desired by the pilot.

Another object is to provide a vertical velocity meter which will give accurate readings and automatically function with small changes in static pressure, and have a sensitivity of substantially plus or minus .01 inch of mercury, and which will suitably compensate for free air temperature, and which will provide accurate readings regardless of lag in static pressure transmission, and which will also completely compensate for any servo motor time lag.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, according to a preferred embodiment of the present invention, a casing is provided in which there are two oppositely acting bellows which respond to variations in static pressure. These bellows are evacuated and enclosed in a casing which is the casing of the instrument, and this casing is connected to the static pressure line or to a static pressure source forming part of an aircraft pitot system.

The bellows act on opposite sides of a Z-shaped lever, the ends of which lever in turn are acted upon by spring members to restore the lever to a predetermined neutral position.

As the lever moves in response to variations in the static pressure in the casing, a mechano-electric transducer will be actuated to give an electrical signal or an error signal. This error signal is amplified and fed to a servo motor which in turn acts upon said springs to hold the system in equilibrium.

There is also provided a servo lag compensator which is adjusted to have a time constant slightly larger than that of the servo motor, and to feed a signal to the compensating coil to preserve the equilibrium of the aneroid element during the time lag of the motor.

The signal to the compensating coil is also fed to the electrical altitude output, and this output is correct for the motor time lag.

Generally, the inputs to the altimeter of the present invention are static pressure, free air temperature, and a manual setting from the sea level static pressure. The free air temperature is computed electrically from measurement of the stagnation temperature and there may also be an automatic temperature input either by way of a manual setting or by way of an air temperature functional output of a velocity or Mach meter.

On the other hand, the electrical outputs of the altimeter of the present invention are the temperature-corrected pressure-altitude, the vertical velocity, and the static pressure, and these outputs will be given with high accuracy from minus 500 feet to plus 80,000 feet above sea level, and with a sensitivity of about plus or minus 10 feet.

The altitude reading is based upon a mean standard atmosphere assuming that the temperature is fixed a constant and that the altitude will vary with the pressure. However if the temperature is not fixed or constant and the temperature is substantially different at one altitude than at another the normal pressure derived altitude is corrected for the temperature and may be referred to as "pressure altitude temperature corrected" or as "temperature corrected pressure altitude."

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 4 is a diagrammatic plan view of a typical indicator or dial face to be associated with the meter of FIGS. 1, 2 and 3.

FIG. 5 is a side elevational view of the connection between the bellows arrangement and the intermediate support.

FIG. 6 is a fragmentary top perspective view of a modified 2-lever arrangement from that shown in FIG. 5, showing the supporting arrangement.

FIG. 8 is a fragmentary top perspective view showing the central pivot mounting associated with the lever arrangement of FIG. 7.

FIG. 9 is a side elevational view partly in section, showing the arrangement of the mechano-electronic transducer.

FIG. 9a is a diagrammatic side elevational view of an alternative mechano-electronic transducer using an E transformer in lieu of the thermionic transducer of FIG. 9.

FIG. 10 is a section on line 10—10 of FIG. 7, showing the arrangement of the sliding guides associated with the mechanism of FIG. 7.

FIG. 11 is a side perspective view showing part of the gearing arrangement which is shown to the right of FIG. 7, but more clearly showing the cam and bevel gear drive arrangement.

FIG. 12 is a side elevational view of the cam arrangement of FIGS. 7 and 11.

FIG. 13 is a diagrammatic perspective layout of the mechanical gearing and driving arrangement of the meter as shown in FIG. 7.

FIG. 13a is a top plan view of either the correction coil D' or the compensating coil E'.

FIG. 13b is an inside asymmetric view of either the correction or compensating coil showing the manner of constructing and mounting the same.

FIG. 14 is a diagrammatic perspective layout of the mechanical gearing and driving arrangement of the meter as shown in FIGS. 2 and 3.

FIG. 14a is a simplified diagrammatic showing of how the information is collected and transmitted to the temperature correction coil of the instrument to give a emperature corrected pressure altitude reading.

FIG. 15 is a transverse sectional view of an altimeter-vertical velocity meter arrangement showing an oblique lead screw arrangement replacing the Z lever and rack arrangements of FIGS. 1 to 14.

FIG. 16 is a side elevational view taken upon the line 16—16 of FIG. 15.

FIG. 17 is a top perspective view of the arrangement shown in FIGS. 15 and 16 partly broken away to more clearly show the interior construction.

FIG. 18 is a transverse sectional view taken upon the line 18—18 of FIG. 17 and upon an enlarged scale as compared to FIG. 17, showing the self-compensating flexure pivot associated with the mechano-electronic transducer.

FIG. 19 is a top perspective view of the complete instrument in its housing and associated with a Mach meter upon a reduced scale as compared to FIGS. 15 to 18.

FIG. 20 is a top perspective view upon an enlarged scale as compared to FIG. 17, showing the connection between the end of the balancing spring and the slide arrangement.

FIG. 21 is a diagrammatic extended perspective view showing the driving and gearing arrangement of FIG. 17 and the manner in which it is driven from the motor and transmitted to the slide and the altitude cam.

FIG. 22 is a side inverted perspective view as compared to FIGS. 17 and 18, and shown on a smaller scale of FIGS. 17 and 18 to better show the connection between the bellows and the main lever and the flexure pivot.

FIG. 23 is a top perspective view on an enlarged scale of the pivotal connection between the lever member and the balancing spring.

FIG. 24 is a top perspective separated view of the self-compensating flexure pivot of FIG. 18 upon an enlarged scale as compared to FIG. 18.

FIG. 25 is a top perspective separated view of the coupling arrangement of FIG. 17.

FIGS. 2 and 3 show one form of static balancer A, and FIG. 7 shows another form of static balancer A' with many of the correspondingly functioning parts in FIG. 7 being indicated by the same numerals as in FIGS. 2 and 3, but primed.

Figure 2:
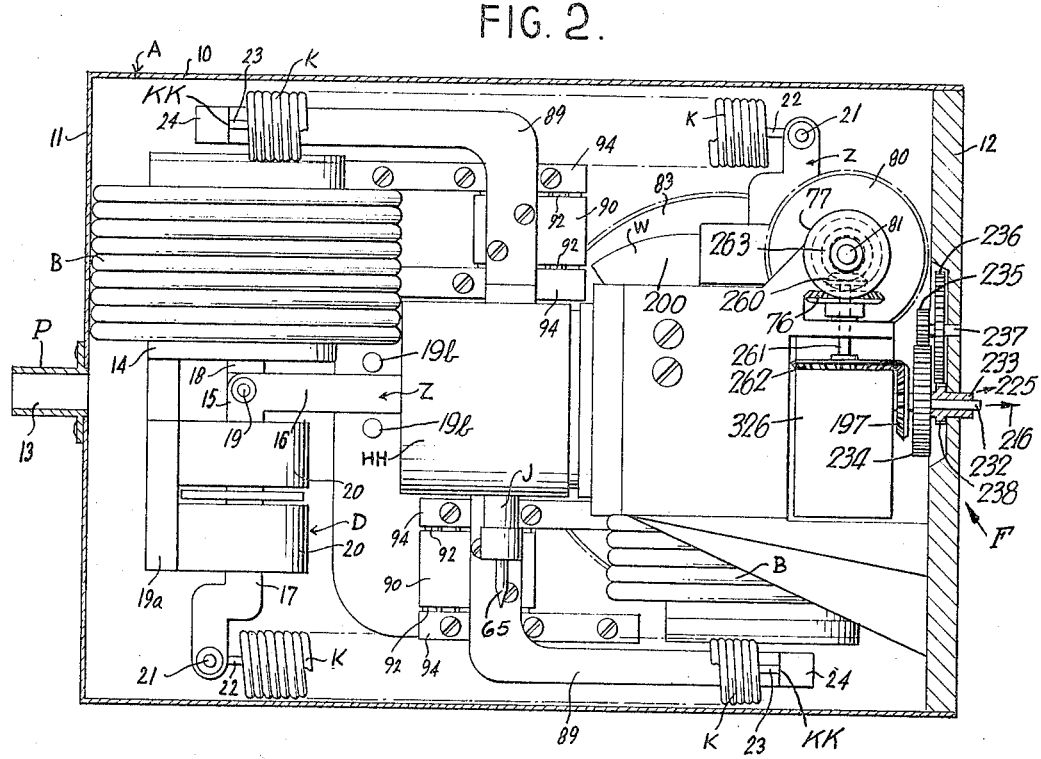
FIG. 2 is a side elevational view of one form of meter with the side of the casing removed.
Figure 3:
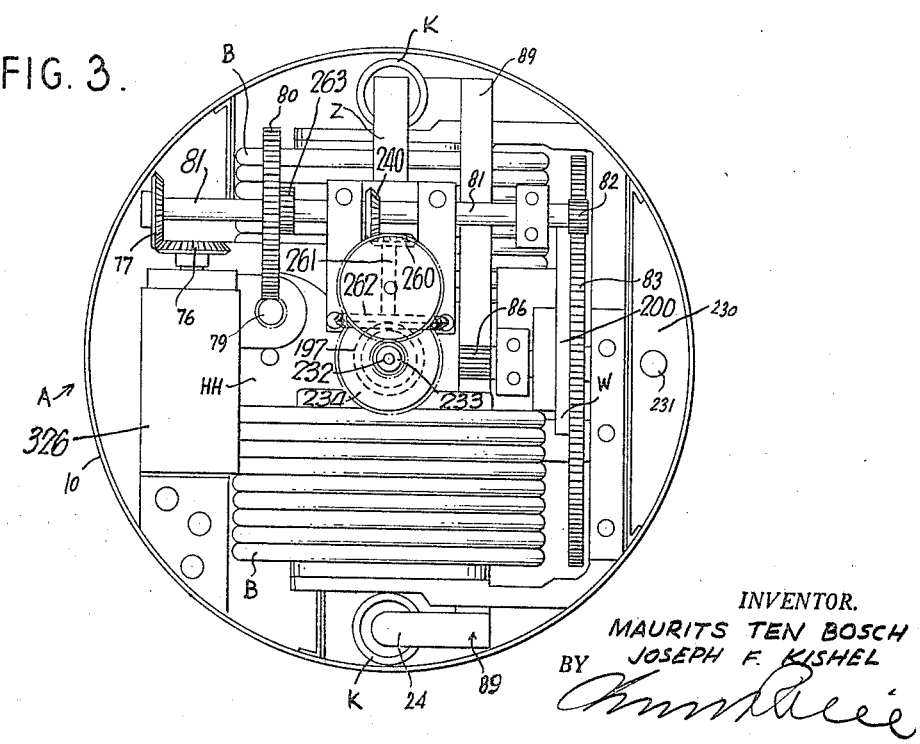
FIG. 3 is an end elevational view of FIG. 2, showing the gearing arrangement and with the wall removed.
Figure 7:
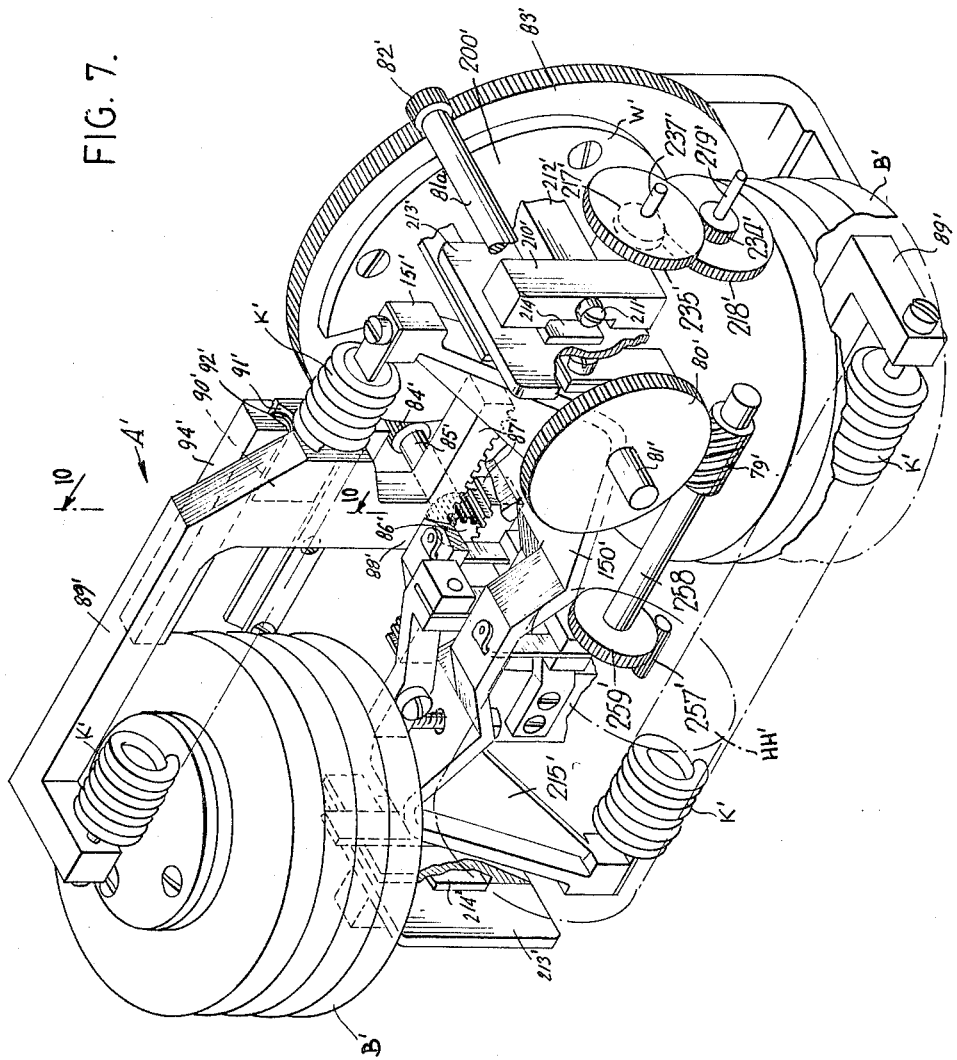
FIG. 7 is a top perspective view of an alternative form of meter with the casing removed.

The driving and gearing arrangements for FIGS. 2 and 3 are shown diagrammatically in perspective in FIG. 14 and the driving and gearing arrangements for FIG. 7 are shown diagrammatically in perspective in FIG. 13.

Figure 1:
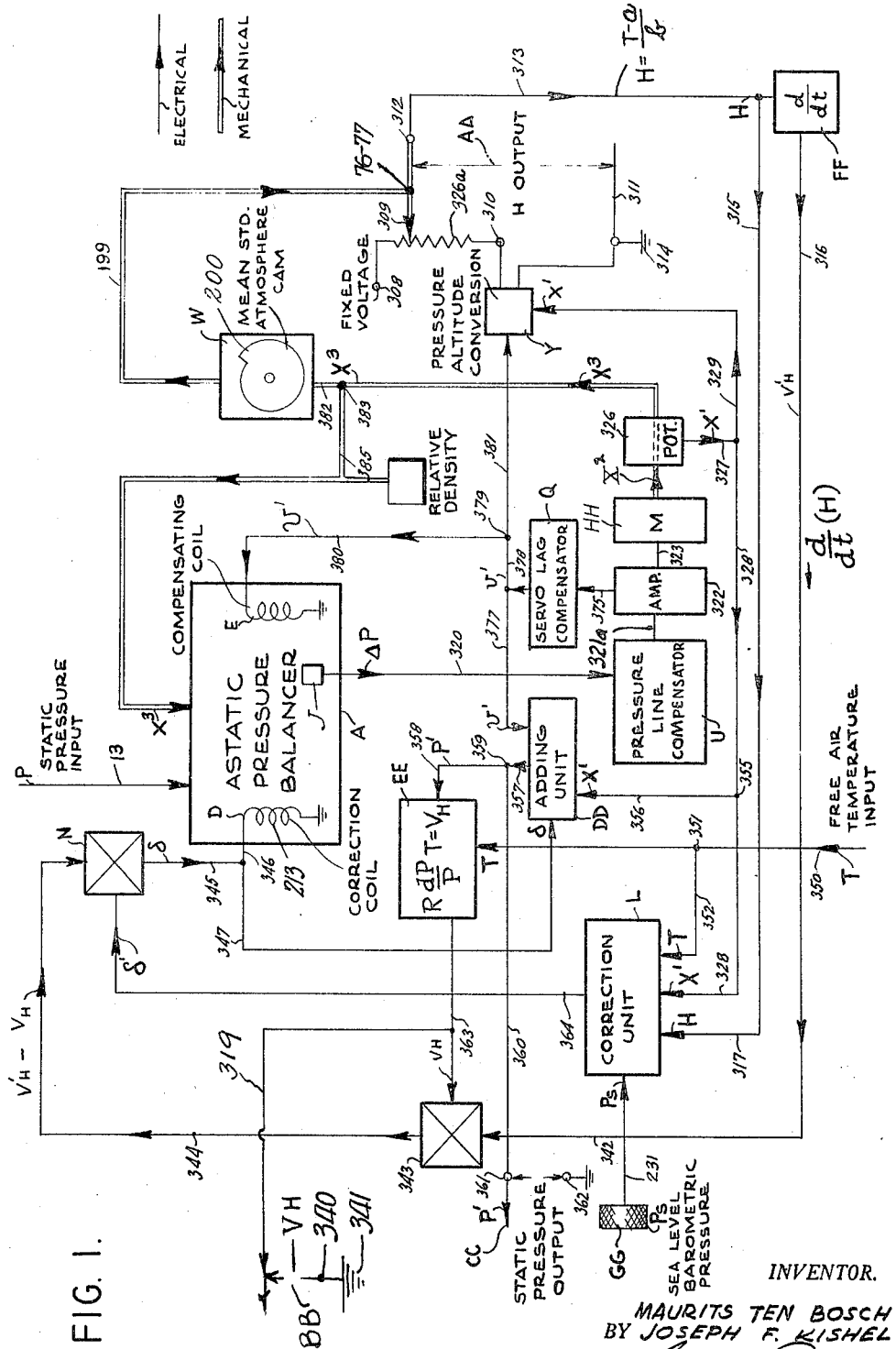
FIG. 1 is a schematic diagram of the layout of the altitude vertical velocity meter of the present invention.

The general schematic layout showing both the electrical and mechanical connections for both the meters of FIGS. 2 and 3 and the meter of FIG. 7 is shown in FIG. 1.

FIG. 5 shows a diagrammatic layout of the lever and bellows arrangement of FIGS. 2 and 3, and FIGS. 4 and 6 also show more detailed arrangements which may be included in FIGS. 2 and 3. FIG. 8 is a detailed perspective showing of the lever arrangement of the meter of FIG. 7.

FIGS. 9, 10, 11 and 12 are detailed showings of elements which are utilized both in the meters of FIGS. 2 and 3 and in the meter of FIG. 7, but which is specifically shown as applied to the meter of FIG. 7.

Referring specifically to the meter of FIGS. 2 and 3, the static pressure balancer A is provided with two bellows B which have connections 18 to a Z-shaped lever Z. These flexible connections may take the form of a band or bar 18 and are indicated at the left of FIG. 2 or a flexible band Ca indicated at the right of FIG. 6.

This Z-shaped lever is provided with a correction coil D and with a compensating coil E by means of which electrical information or error signals may be transmitted to an indicating device, such as the dial and associated mechanism F as shown in FIG. 4.

The mechanism as shown in FIG. 5 has a central, pivotal structure G with which is associated the mechano-electronic transducer J.

The transducer J will operate in the same manner as J' of FIG. 9 with a movable plate 57x being moved toward or away from the grid 60' to create a signal. The movement of the lever Z will move the plate 57x.

The springs K will tend to bias the lever Z into neutral position.

Referring to the embodiment of FIGS. 2 and 3, the instrument A may be enclosed in a cylindrical casing 10 having the end walls 11 and 12.

The conduit 13 will supply static pressure P to the casing 10 of the instrument A through the wall 11 and this static pressure will press upon the evacuated bellows B.

The evacuated bellows are mounted at the plates 14 and they act upon the elbow portions 15 of the lever Z.

The lever Z has a horizontal arm portion 16 on one side of said elbow 15 and at the other side they are provided with the vertical extensions 17.

The end plates 14 of the bellows B are connected by the metal strap 18 through the connection 19 at the elbows 15 of the lever Z.

The bracket 19a will carry the double solenoids 20 forming part of the correction coil D. The solenoids 20 enclose the vertical portions 17 of the Z lever 16.

The lower end of the arm 17 has pivotal connections 21 to the ends 22 of the springs K. The springs K at their other ends 23 are connected to the mounts 24 on the housing.

The lever arrangement is shown removed from the mechanism and diagrammatically in one form in FIG. 5 and in another form in FIG. 6. In FIG. 6 correspondingly functioning parts are indicated by the same letters and numerals as in FIGS. 2, 3 and 5 provided with a small a.

The center Ga of the lever Z has an upper strap 35a and a lower strap 36a (see particularly FIG. 6) which forms a box between the upper support frame member 41a and the lower support frame 38a.

The strap 36a may ride in the slot 37a in the lower frame member 38a while the slot or opening 39a in the upper strap 35a will receive the lower end 40a of the upper frame member 41a.

Between the frame members 38a and 41a the diagonally crossing suspension rod or wire elements 42a, 43a, 44a and 45a will be provided to suspend the pivot box Ga of the lever Z in position, so that it may swing laterally in the direction indicated by the double curved arrow 55a.

Fitting in a slot 56' at the lower part of the strap 36' will be the mechano transducer element, as shown in FIG. 9. This element has a plate shaft 57', the end of which rides in said slot 56', and it is also provided with a metal shell 58', a cathode enclosed therein 59', a grid 60', a plate 61', a getter 62', an internal shield 63', a heater 64', an exhaust tip 65' and the connections 66'.

As the lever Z swings in the direction 55, its action on the stem 57' will move the plate 57x (see FIG. 9) closer to or farther away from the grid 60' and will cause an electrical signal to be transmitted through the wire conduits 66' and to line 320 to a compensator U as shown in FIG. 1.

The angle of the swing 55 and the movement of the stylus or plate shaft 57' will be determined by the static pressure input P through the conduit 13 as applied to the evacuated bellows B.

The mechanical gearing and driving arrangement for the embodiment of FIGS. 2 and 3 is best shown with some variation in alternative embodiments in FIG. 13 and in FIG. 14. The servo motor HH will be actuated in accordance with information supplied from the mechano-electronic transducer of FIG. 9 which has been suitably compensated and amplified as will be more fully described in connection with the diagrammatic layout of FIG. 1.

In FIG. 14 the geared shaft 257 of motor HH drives gear 259, shaft 258, worm 79, gear 80, shaft 81, gears 263 and 264 and shaft 81a. In FIGS. 2 and 3, shaft 81 replaces and combines shafts 81 and 81a of FIG. 14 and gear 82 on shaft 81a is shown as driving gear 83 and gears 263 and 264 are omitted. In FIGS. 2 and 3 gears 82 and 240 are carried on shaft 81.

In FIG. 14 the connection $X_2$ of FIG. 1 includes the various elements designated 257, 258, 259, 79, 80, 81, 76 and 77, while the connection $X_3$ of FIG. 1 includes the elements 257, 259, 258, 79, 80, 81, 264, 81a, 83 and 199. The potentiometer modified the electrical $X_1$ supplied to the lines 327, 328 and 356 and both are driven mechanically by the motor HH. In FIG. 14 the potentiometer is indicated at 326.

As shown in FIG. 14 the motor HH will drive the toothed shaft 257 which in turn will drive the pinion 259 and the shaft 258. The shaft 258 in turn will drive the worm 79.

The worm 79 will drive the gear 80 on the shaft 81. The shaft 81 is split because of the limited space available within the meter housing into a second shaft 81a with the drive being transmitted through the small gears 263 and 264.

The shaft 81 will also carry the bevel gear 77 which meshes with and drives the bevel gear 76 and drives the potentiometer 326.

The shaft 81a will drive the small gear 82 which in turn will drive the large gear 83 on one side of which is mounted the mean standard atmosphere cam arrangement W carrying the actual cam plate 200.

The cam plate 200 through the follower roller 201 and the connection 199 will reciprocate the rack member 202 which has a central guide slot 256. This rack 202 will actuate the gear 203 which will be connected to the shaft 198 and drive the gear 86. The gear 86 will mesh with the two racks 87 at its opposite sides and will move the outside arms 89 together or apart against the springs K.

The other ends of the spring K will react upon the outside ends of the lever Z to restore the apparatus and reduce the error signal to 0.

In the embodiment of FIG. 14, also connected to the shaft 81a will be the bevel gear 240 which meshes with and drives the bevel gear 260.

This bevel gear 260 is connected through the shaft 261 to the bevel gear 262 which meshes with and drives the bevel gear 197. The bevel gear 197 will drive the shaft 232, which in turn will drive the indicator pointer 216.

The gear 234 on the shaft 232 is connected to drive the gear 235, which in turn will drive the gear 236 on the shaft 237. The gear 236 meshes with the pinion 238 and this drives the sleeve 233, which in turn drives the indicator pointer 225.

These pointers are shown on the indicator dial of FIG. 4 which may be positioned on the right side of the instrument housing of FIG. 2 and upon the wall 12. It will be noted that the dial F as shown in FIG. 4 has inside graduations giving the altitude in feet in thousands on the inside circle and in hundreds on the outside circle.

The inside indicator pointer 216 will therefore read in thousands and the outside indicator pointer 215 will read in hundreds.

The dial face F has a manual adjustment GG by means of which it will be possible to insert a correction $P_S$ for the sea level barometric pressure.

This manual adjustment GG may be connected to the shaft 321 of FIG. 1 as is also shown at the right of FIG. 3 and in FIG. 3 shaft 321 extends into the space 230 carrying the circuitry.

In the embodiment of FIGS. 2 and 3 the members 89 have guide plates 90 (see FIG. 2) which carry balls 92 riding in slots in said fixed guide rails 94.

The operation of the meter of FIGS. 2 and 3 is diagrammatically illustrated in FIG. 1.

The altitude and vertical velocity meter which is shown will have static pressure P through line 13 as an input together with the free air temperature T by the line 350. To the lower left of FIG. 1, the manual setting may be represented by $P_S$, in FIG. 1 and this is applied by means of turning the knob GG on the shaft 231 which applies such correction to the correction unit L at the lower left of FIG. 1. The static pressure P may be applied directly to the astatic pressure balancer A shown in FIG. 1 so that such pressure is applied directly to both evacuated bellows B of FIGS. 2 and 3 which in turn will cause a movement of the lever Z (see also FIGS. 5 and 6).

In operation, the altitude and vertical velocity meter of the present invention will convert the inputs of static pressure P, free air temperature T, and manual setting for sea level static pressure $P_S$ into outputs of temperature-corrected, pressure-altitude H, vertical velocity $v_H$ and modified static pressure P'.

As shown in FIG. 1 the outputs will be the altitude output at AA, the vertical velocity output BB and the modified static pressure output CC.

The bellows in the astatic pressure balancer A will respond to variations in static pressure input P. This will cause movement of the Z-lever and an error signal to be produced by the transducer J of FIG. 9.

Because of the balanced wire support indicated at 42, 43, 44 and 45 of FIG. 6, the Z-lever moves or racks in direction 55a, and this movement, together with the corrections which are fed in by means of the correction coil D and the compensating coil E will create an error signal at transducer J from which the outputs may be derived.

The springs K, shown at the top and bottom of FIG. 2, are associated with the racks 87 and hold said racks 87 in such position that the entire arrangement is in equilibrium and is floating in neutral position.

At sea level the two bellows B, the lever Z and the springs K are balanced, with said springs K being sufficiently extended so that the entire linkage is in equilibrium and is floating.

As the aircraft climbs, the static pressure input passing into the chamber A by the line 13 will cause a reduction of pressure in the chamber A and result in an expansion of the bellows B.

With this reduction of pulling force on the bellows B, the springs K will throw the system out of balance.

This unbalance is sensed by the mechano-electronic pickoff of FIG. 9 which moves the stylus 57' to give an electrical error signal.

This electric signal or error signal is indicated as at $\Delta P$ in FIG. 1 and is transmitted by the line 320 to the pressure line compensator U.

The pressure line compensator U consists of a resistance-capacitance network which drives the amplifier 322 through the electrical connection 321a.

Then the amplifier 322 in turn through the electrical connection 323 will drive the servo-motor HH.

Then the servo-motor HH will drive the potentiometer 326.

The mechanical drive connections from the motor will also extend as indicated by X to the mean standard atmosphere cam W and to the balancing arrangement inside of the balancer A.

The mechanical drive X as shown diagrammatically in FIG. 1 is shown in detail in FIG. 14 as being driven from the motor HH and the gear, worm and shaft elements 257, 259, 258, 79, 80, 81, 263, 264, 81a 82, and 83. The cam W in FIG. 4 is shown connected to the balancer A by the shaft 199 or as shown in FIG. 14 the motor HH may drive the potentiometer 326 through the connection of the drive elements 257, 259, 258, 79, 80, 81, 77 and 76. In FIG. 14 the potentiometer structure is shown.

The mean standard atmosphere cam 200 has a connection 199 to the junction 76–77 with the resistor contact 309 moving with the connection 312 to the line 313.

The connection 312 will give one side of the temperature corrected pressure altitude output H, the other side of the output will be connected to the line 311 which is grounded at 314 and which leads to the pressure altitude conversion Y.

The pressure altitude conversion Y has a potentiometer and bridge to generate a function which will add to the output of the mean standard atmosphere cam W to give the true altitude. The resistance 326a also has a connection at one side to the fixed voltage source 308 and at the other side has a connection 310 to the pressure altitude conversion Y.

From the connection 312 there is also a connection 313 giving a signal corresponding to the density altitude output H to the differentiating device FF represented by $d/dt$.

This differentiating device FF will determine the time derivative of the altitude output H from which the vertical velocity may be derived.

From the line 313 the information from one side of the density altitude output H will also be transmitted through the lines 315 and 317 to the correction unit L.

The vertical velocity information supplied from device FF is derived through the mean standard atmosphere cam W and the information from the device EE is corrected information and the difference will be transmitted through the line 344 to the electrical unit N which adds or subtracts information through the lines 344 and 364 and transmits it through the line 345 to the coil 213.

The device is indicated by the boxes Y, U, DD, EE, L, FF, and N or all electrical computer devices including capacities and coils for adding and subtracting the information supplied and then submitting it after such addition and subtraction.

These devices as exemplified by the device 343 may consist of a series of connected grids of vacuum tubes.

Connection 319 leads to the vertical velocity output BB represented by $v_H$. The other side of the output BB has the connection 340 to the ground at 341.

The other branch connection carrying information from the circuit FF leads at 342 to the electrical addition device 343 which consists of a series of connected grids of vacuum tubes.

The electrical adding element 343 will receive vertical velocity information through the line 363 from the unit EE, which information is designated by $v_H$.

This information which it obtains from the unit EE will result from a combination of the information supplied as to the free air temperature represented by the letter T and supplied through the line 350 and will also include static pressure information P′ supplied through the line 358 to the unit EE. Unit EE is a conventional electrical computer unit which transforms information T and P from lines 350 and 358 into velocity information.

It will be noted that the information $v'_H$ supplied from the differentiator FF will be subject to addition or subtraction in respect to the information supplied from the unit EE with the result that the line 344 will feed information represented by the sum or difference $v'_H - v_H$ to the unit N.

Except for transient conditions, there is only a small difference between the signal $v'_H$ and $v_H$ since the feedback loop consisting of unit DD, EE, differential 343, adding amplifier N, and line 347 provides for keeping this air signal to a very small value.

The unit N will also receive information through the line 364 from the correction unit L which will enable a temperature correction.

The unit N and the unit L are conventional electrical addition units, the unit N adds the information derived from lines 344 and 364 and supplies the signal or information $\delta$ to the coil 213.

The unit L is a conventional electrical addition unit for adding or subtracting the information or signals passing through lines 317, 321, 328 and 352 and supplies it to line 364.

The unit DD similarly adds the information or signals supplied through lines 347, 356 and 377 and in turn supplies a corrected static pressure signal or information through lines 358 and 360.

The difference $v'_H - v_H$ is a correction which is supplied to the electrical adding unit N and it results from a comparison of the two values as obtained from the electrical units EE and FF.

This information when combined with the information supplied through the line 364 will be supplied through the lines 345, 346 to the correction coil D in the balancer box A. The information will also be transmitted from the unit N through the lines 345 and 347 to the adding unit DD.

The adder unit DD provides a signal proportional to the static pressure P by combining the correction in the same manner as it is done on the astatic pressure balancer. The static pressure P at the input of A and the output of the adding unit DD are proportional to each other, but the first one is an air pressure and the second is an electrical signal.

From the adding unit DD this information is transmitted as static pressure information through the line 357 to the branch point 359. Thence it is transmitted through the line 358 to the $v_H$ unit EE and also through the line 360 to the static pressure output CC. This static pressure output has a connection at 361 on one side and at 362 on the other side, which other side is grounded.

The correction unit L receives information from four sources.

One source is altitude information H which it receives through the lines 313, 315 and 317.

The correction unit L also receives information through the lines 327 and 328 from the potentiometer 326 which is driven by the servo motor 324.

Thirdly, it receives free air temperature information T through the lines 350 and 352.

Fourthly, it receives a correction or manual setting for sea level static pressure $P_S$ from the manually operated knob GG.

The servo lag compensator unit Q will be supplied with information through the line 375 through the amplifier 322. This servo lag compensator Q includes a resistance-capacitance network.

Information $v'$ will be supplied from the servo lag compensator Q through the line 377 to the adding unit DD, through the line 380 to the compensating coil E in the balancer box A and through the line 381 to the pressure altitude conversion Y.

The pressure altitude conversion Y also receives information X′ through the line 329 from the potentiometer 326. The adding unit DD adds the electrical information which it obtains from the potentiometer 326a through the lines 327, 328 and 356 and also the information which it obtains from the servo lag compensator Q through the line 377 and further the information which it obtains from the unit N through the line 347 and this information is then supplied as static pressure information both to the static pressure output CC as well as to the $v_H$ unit EE.

As is apparent from the layout of FIG. 1, the inputs will be the free air temperature input T, the static pressure input P and the correction for sea level barometric pressure $P_S$.

The outputs on the other hand will be the static pressure output CC, the altitude output AA and the vertical velocity output BB.

In the layout of FIG. 1, the electrical connections are indicated by single lines with an arrow indicating the flow of information while the mechanical connections are indicated by double lines, also with an arrow indicating the flow of information.

In restoring the balancer A, the motor HH through gearing such as shown in FIG. 14 drives the racks 87. Movement of racks 87 will overcome displacement arising from the decrease of static pressure on the bellows B in conjunction with the lag compensating coil E and the temperature correction coil D.

The mechano-electronic pickoff of FIG. 9 will detect very small changes in static pressure and at the same time the units EE and L, as shown in FIG. 1, will accept temperature information T as an input and will compensate the static pressure measurement for changes in the free air temperature.

The sensitive proportional pickoff not only allows the differentiation required for vertical velocity to be performed electrically, but also allows the instrument to be stable at a much smaller differentiating time constant. Furthermore, the size and weight of the instrument has been greatly reduced and it is readily possible to compensate for the lag in measurement of the vertical velocity, for the lag in measurement of the static pressure and for the lag in operation of the servo-motor.

The temperature input T permits automatic correction for changes in air density with temperature and hence permits the measurement of changes in density rather than pressure in connection with the altitude.

The altitude increments are integrated to obtain the altitude of the aircraft above a standard pre-set reference level and the temperature corrections are applied so as to cause a minimum variation in the constant integration.

The signal fed to the correction coil D will compensate for the departure of the sea level static pressure $P_S$ from the mean value which is designed into the cam W. Furthermore, it will compensate for the departure of the sea level free air temperature $T_S$ from the mean value, also designed into the cam W.

Furthermore, it will compensate for the temperature variation of the actual atmosphere from that of a standard atmosphere.

The balancer unit A will be in equilibrium in accordance with the equation:

$$P = X + \delta + v'$$

where

P represents the electrical static pressure output.

X represents the output of the potentiometer 326 driven by the servo-motor M and $\delta$ represents the correction to be supplied to the coil D.

The vertical velocity output may be ascertained by the equation:

$$v_H = DT d/dt (\log P)$$

In this last equation:

D represents a constant.

P represents the static pressure.

$v_H$ represents the vertical velocity.

This last mentioned equation gives the differential relationship between the pressure and altitude.

An alternative form of equation is shown in box EE of FIG. 1 and in FIG. 14a. The equation applied to the line 313 indicates the derivation of altitude in terms of temperature involving constants $a$ and $b$ and this information is transmitted through the line 313.

The mechano-electronic transducer element of FIG. 9 has high sensitivity and will respond to a ten foot change in altitude at 60,000 feet.

The lag compensator unit Q allows rapid determination of altitude and vertical velocity without instability.

The free air temperature correction coil D enables readings of temperature corrected altitude rather than standard pressure altitude and gives the true vertical velocity. The entire unit may be conveniently built into a casing which is approximately 4¾ inches in diameter and 7 inches long.

The astatic pressure balancer A shown in FIGURE 1 has four inputs of which P is the static pressure from the pressure line of the aircraft, X is a mechanical drive which produces a proportional spring force, E is a compensating coil for transient corrections, and D is a correction coil for applying slowly varying corrections, for example, for temperature. The sum of the forces exerted by these four inputs is zero in the balanced condition; and deviations are indicated by a pick-up J, which provides an output, $\Delta P$.

The pressure, P, can deviate from the free air static pressure when P changes, because the air encounters resistance in flowing through the line to the volume of the instrument. This lag can be reduced by applying a correction in the output $\Delta P$. The pressure line compensator U consists essentially of a lead network as shown, for example, on page 114, FIG. 3.21(a), of Radiation Laboratory Series, volume 25, "Theory of Servo Mechanisms," by Hubert M. James, et al., McGraw-Hill, New York, 1947. In this figure $E_1$ would be the applied electrical signal $\Delta P$, and $E_o$ would be the output to the servo amplifier 322.

If the motor HH would be infinitely fast, it would keep the pressure balancer in equilibrium at all times. However, the finite response requires, for stability, a compensation which is accomplished through the servo lag compensator Q and the compensating coil E. The network of Q can be calculated by using methods, for example, explained in the same book following page 73, chapter 2.27, "Multiloop Servo Systems," and page 196, chapter 4.14, "General Discussion of Equalization." The network itself would be in its arrangement similar to the one shown in FIG. 4.62, page 227 of the same textbook.

This arrangement permits one, therefore, to keep the pressure balancer in a stable balance, and the input pressure P is then a direct function of the shaft rotation X plus the signal $v'$ which appears on the compensating coil E. As previously explained, the signal $v'$ which appears on the compensating coil E. As previously explained, the signal $v'$ is transient in nature.

The shaft rotation X, which represents pressure, is converted into an electrical signal for standard atmosphere altitude H through the cam 200 in unit W, which drives the brush 309 of the potentiometer 326. The brush motion follows the servo motor motion which is in error by the servo motor lag. Therefore, the error signal $v'$ is converted into an altitude error in the pressure altitude conversion unit Y and added electrically to the potentiometer voltage.

For altitudes under 36,000 feet the relation used for standard atmosphere is:

$$X = P_0 \left(1 - \frac{aH}{T_0}\right)^n$$

where $P_0$, $a$, $T_0$ and $n$ are constants and by differentiation $$\Delta H = \left(\frac{T_0}{anP_0^{\frac{1}{n}}}\right) \cdot X^{\frac{1-n}{n}} \cdot v'$$

$$= \text{const.} \cdot X^{\frac{1-n}{n}} \cdot v'$$

Therefore, the pressure altitude conversion unit can consist of a non-linear potentiometer which represents the function $$X^{\frac{1-n}{n}}$$

and which is energized from $v'$. The voltage on the brush is then $\Delta H$ which is added to the voltage existing between points 309 and 310.

Standard atmosphereic conditions represent only an average of the actual altitude pressure relation in the atmosphere. The correction coil D is used to provide for the following deviations from mean standard atmosphere:

(1) The departure of sea level static pressure $P_S$ from the mean value $P_0$ designed in the cam, which requires a correction term $\delta_P$.

(2) The departure of sea level free air temperature $T_S$ from the mean value of $T_0$ designed in the cam, which requires a correction term $\delta_T$.

(3) The departure of the temperature gradient (lapse rate) of the actual atmosphere from the mean standard lapse rate.

The first correction $\delta_P$ is obtained by differentiating the standard atmosphere equation and is $$\delta_P = X\left(\frac{P_s}{P_0} - 1\right)$$

$P_0$ is a constant. $P_S$ is introduced mainly through knob GG as a rotation of a brush on a linear potentiometer which is energized from the electrical value for pressure X.

Similarly for the sea level temperature $T_S$, the correction $\delta_T$ is $$\delta_T = \frac{P_0^{\frac{1}{n}} \cdot n \cdot a}{T_0^2} \cdot X^{\frac{n-1}{n}} \cdot H \cdot (T_S - T_0)$$

Instead of the temperature $T_S$ we use the free air temperature T at the altitude H, then $$T_S = T + a \cdot H$$

Therefore, $$\delta_T = C_1 \cdot X^{\frac{n-1}{n}} \cdot H \cdot (T + aH - T_0)$$
$$= C_1 X^{\frac{n-1}{n}} \cdot H\{(T - T_0) + aH\}$$

Since H is a function of X $$\delta_T = C_1 \cdot f_1(X) \cdot T + C_1 f_2(X) \cdot a$$
$$= \delta_T' + \delta_T''$$

where $f_1(X)$ and $f_2(X)$ are predetermined functions of X.

These functions can be generated as voltages from the electrical output X following the methods described in "Electronic Analog Computers," by Granino A. Korn, McGraw-Hill, New York, 1952, page 275, "The Synthesis of Other Function Generators Based in Diode Circuits" or preferably generated by potentiometer function generator (potentiometers) driven by the mechanical X output. For examples, see Section 6.6, page 261 of said Korn textbook, "Tapped Potentiometers as Function Generators." The accuracy with which these functions are reproduced is about 5%. By means of a resistance proportional to the temperature T (in the Mach Meter and Temperature Probe) the voltage $f_1(X)$ is multiplied by T.

The three correction signals $\delta_P$, $\delta_T'$, $\delta_T''$ are combined and amplified in a summing amplifier in a manner shown on FIG. 1.7(d), page 11 of said Korn textbook. The amplified signal $\delta'$ is applied to the correction coil D in the pressure balancer.

If the setting for the sea level barometric pressure $P_S$ is correct, then the previously explained correction will be such that the electrical altitude output H in line 313 is the true altitude at the point of measurement. If the temperature gradient (lapse rate) based on the standard atmosphere is equal to the actual temperature gradient in the air, then the correct altitude will be maintained during altitude changes. Differentiating this output in unit FF by circuits such as shown in FIG. 1.7(h), page 11 of said Korn textbook, will then furnish a signal proportional to the actual vertical velocity.

Actually, the temperature gradient in the air differs generally from the value assumed for the standard atmosphere and can vary as function of altitude. The actual vertical velocity can, however, be measured directly from the equation:

$$\frac{dH}{dt} = -\frac{RT}{P}\frac{dP}{dt}$$
$$= -RT\frac{d\log P}{dt}$$

where P is the static pressure and T is the free air temperature. The pressure P is available in the system as:

$$P = X + v' - \delta$$

This adding and subtracting is performed in unit DD with a circuit as shown in FIG. 1.7(d), page 11, of said Korn textbook. The output P is multiplied with T available as a proportional resistance in the Mach meter and then differentiated again using the circuit of FIG. 1.7(h), page 11, of said Korn textbook. These functions are performed in unit EE. The output which represents the true vertical velocity $v_H$ is subtracted from the output of the unit FF, because the signs of the outputs are selected such that this can be done by simply putting the two voltages in series as indicated schematically by the differential 343 on FIG. 1 of the application. The difference is then added to the previously determined corrections $\delta'$ in unit N, which is then fed into the correction coil D. $\delta$ is also fed back into the adding unit DD and the gain in the loop is selected such that this tends to keep the error $v_H' - v_H$ negligibly small.

In effect, we have, therefore, compensated for the actual temperature gradient in the air, and the output of H on line 313 will then reflect actual altitudes under all conditions except for a possible constant error caused by inaccurate setting of $P_S$ on knob GG.

The arrangement of FIGS. 7, 8, 10, 11, 12 and 13 is similar to that of FIGS. 2, 3 and 14 and correspondingly functioning parts are indicated by the same letters and numerals primed.

The lever fulcrum system of the embodiment of FIG. 7 varies from the fulcrum system as shown in FIG. 6, in that bands are utilized in lieu of the wires or rods as shown in FIG. 6.

The lever Z' has arms 150' as shown in FIG. 8. The arms 150' have the reinforcing webs 152 and it has the transverse plate portions 153'.

The lever Z' is supported above the mechano-electronic transducer as shown in FIG. 9, by three vertical metal bands 154', 155' and 156'. The bands 154' and 156' are mounted by the rivets or pins 157' to the structural members 158'. At their upper ends the bands 154' and 156' extend through the slots 159 and they are then bent over as indicated at 160 and pinned in position as indicated at 161. The bands 154 and 156 thus will act the same as the wires 42 and 43 of FIGS. 5 and 6 in holding the central fulcrum portion 162' of the lever in balanced position.

The band 155' on the other hand is connected to the structural member 163' and is pinned in position in the slot 164' by the pin 165'. The structural member 163' is held by the arm 166' and the screw mount 167'. The screw 167' will extend into a supporting structure (not shown). The arm 166', in turn, is suspended upon the bolt 168', which extends through the opening 169' to the fixed structure 170'.

The fixed structure 170' also carries the arm 171' of the structure 157' by means of the screws 172'.

The band 155' will project through the slot 173' of the central portion 174' of the fulcrum 162' of the lever Z' and hold it upwardly in the same manner that the bands 154' will hold the outside portions 175' at the fulcrum 162' of the lever Z' upwardly, giving a balanced mount.

The lever Z' and its arms 150' of FIG. 8 will function in the same manner to actuate the mechano-electronic transducer J of FIG. 9 as does the lever Z of FIG. 6.

The embodiment of FIG. 7 also differs from the embodiment of FIGS. 2, 3 and 6, in that instead of the coils D and E encircling the arms 17 of the Z-lever, there are provided instead U-shaped permanent magnets 210', which are held in position by the screws 211' on the structural portions 212'. Portion 212' is part of the frame structure (not shown).

These U magnets 210' will act upon the flux from the flat coils 213', which are held in position by the arcuate holders 214' on the arms 215' of the lever Z' of FIG. 8.

Referring to FIG. 10 there is shown an alternative guide arrangement which may be also utilized in connection with the embodiment of FIGS. 2 and 3.

The lever 89' has guide plates 90' with the grooves 91' which carry the ball bearings 92' which ride in the slots 93' in the fixed guard rails 94'.

Normally the ball bearings 92' will continuously circulate into and out of the grooves and slots 91' and 93' as the elements 89' reciprocate with the guide plates 90'.

The gearing and mechanical drive arrangement for FIG. 7 as shown in FIG. 13 is generally the same as that shown in connection with FIG. 14. However, the drive for the hundreds indicator pointer 225' is after the cam W' instead of before the cam W'.

The rack 202' as shown in FIG. 13 will drive the shaft 198' through the gear 203'. This in turn will drive the gear 77' meshing with the gear 76' which drives the potentiometer 326'.

The shaft 198' will also drive the bevel gear 205' which in turn drives the bevel gears 211' and 212'. The bevel gear 211' drives the meshing bevel gears 215' which drive the thousands indicator counter 216'.

The bevel gear 212' through a series of shafts and gears will drive the indicator handle 225' as indicated in FIG. 13. FIGS. 13 and 14 show alternative arrangements for driving cams 200 and 200' and indicators 225 and 225'. The output X will be the same in both instances.

To summarize the differences between the embodiment of FIGS. 13 and 14, in the embodiment of FIG. 13 the servo motor HH' drives through the gearing 79' and 80' and the shafts 81' and 81a' and the gearing 82', 83', 84' and 86' and the rack 87' to apply balancing force to the spring K' to extend the springs and balance the lever Z'.

The cam W' in turn will drive the potentiometer 326' and the thousands indicator 216' as well as the hundreds indicator 225'.

On the other hand, in the embodiment of FIG. 14 the servo motor HH drives the potentiometer 326 and the hundreds indicator 220 as well as the thousands indicator 216 directly through gearing extending from gear 80 to gear 34 in the lower part of FIG. 14, while the lever Z is restored through the cam W.

In FIG. 13, on the other hand, the lever Z' is restored through the gearing arrangement 82', 83' and 84' by-passing the cam W'.

The present apparatus is particularly desirable to prevent inaccurate determination of altitude which might arise from pressure inversions.

Since the air does not have a standard distribution the information obtained by the instrument of the present invention is corrected to a standard atmospheric condition.

In the arrangement shown the information concerning the static pressure P and the information concerning the stagnation temperature $T_0$ which has been modified to give the free air temperature to eliminate frictional effects are employed in the arrangement of FIG. 1 to give the vertical velocity information.

At the same time the altitude information is differentiated to provide an indication of the vertical velocity and the two values are compared and any difference is applied electromagnetically to the pressure sensitive balance arm Z. This will modify the output altitude and the result of this modification is to convert the output altitude into the temperature corrected altitude and is devoid of any errors which may arise from pressure inversions.

The mean standard atmosphere cam W acts to restore the balance lever Z acting with or against the temperature and lag corrections supplied by the correction and compensating coils D and E. The present instruments, by measuring altitude from the pressure and temperature of the air rather than the pressure of the air alone and by correcting the pressure measurements by the temperature measurements, give an indication which is highly accurate and altogether free of variations due to failure of the actual atmosphere to correspond to the standard atmosphere. Where a pressure altitude is measured instead of a density altitude, as is done in the present invention, there can be considerable error in the actual measurement which is obtained.

A particular feature of the present invention resides in the fact that there is an avoidance of friction.

The suspensions XX of FIG. 5, and XXa of FIG. 6, the straps 156' of FIG. 8 and 332 of FIG 18 will permit rocking of levers Z, $Z^1$ and $Z^2$ without friction.

The spring constants and the path of the restoring springs are chosen so that the linkage remains in indifferent equilibrium over the complete altitude range with consequent high sensitivity even at high altitudes.

As the springs K are extended to balance changing pressures on the bellows, the ends of the springs K are moved along such a path as to keep the system in such indifferent equilibrium. This means that when a pressure change $\Delta P$ applied to the bellows creates a torque about the axis of rotation XX, this torque will generate rotation of the linkage without causing a counter or restoring torque.

Thus extremely high sensitivity may be maintained over the entire operating range. This construction in conjunction with the use of flexure members throughout the linkage avoids coloumb friction. For example, the torque displaces the electronic transducer to produce a signal directly proportional to the pressure change. This allows derivative control to be used in the restoring circuit with consequent reduction in time lag.

No mechanical force is required to rotate lever Z around the axis XX because of this static balance.

In the embodiments of FIGS. 15 to 22, similarly functioning parts as in FIGS. 1 to 14 are referred to by the same letters and numerals except that they are provided with a superior 2.

Referring specifically to FIGS. 15, 16 and 17, the static pressure balancer $A^2$ is provided with two bellows $B^2$ which have flexible connection $C^2$ (see FIG. 18) to a balancing arm or lever $Z^2$.

The lever $Z^2$ is provided with a temperature compensating coil $D^2$ and also with a lag electromagnet correction coil $E^2$.

FIG. 18 shows the central pivotal structure or self-compensating flexure pivot $G^2$ with which is associated the mechano-electronic tranducer $J^2$.

The two coil springs $K^2$ tend to bias the lever $Z^2$ into neutral position.

Referring particularly to FIGS. 15, 16 and 19, it will be noted that the instrument $A^2$ is enclosed in a cylindrical casing $10^2$ having the end walls $11^2$ and $12^2$.

A conduit similar to the conduit 13 of FIGS. 2 and 3 will supply static pressure P to the interior of the housing $10^2$, and preferably through the wall $11^2$.

The springs $K^2$ have adjustable pivotal connections $21^2$ to the ends $15^2$ of the arm or lever $Z^2$.

At their other ends the springs $K^2$ have connections $23^2$ to the block members $24^2$ (see FIG. 17).

Referring to the central flexure pivot $C^2$ as illustrated in assembled form in FIG. 18 and in separated form in FIG. 24, the swinging lever $Z^2$ has a channel structure $36^2$ mounted thereon and extending vertically therebelow.

This channel member $36^2$ carries the vertical flexible straps $C^2$ which are actuated by the bellows elements $B^2$.

These straps $C^2$ are positioned on the outside faces 310 and 311 of the channel member $36^2$ of FIGS. 18 and 24.

The straps $C^2$ as shown in FIG. 15 are connected to pivot members $19^2$ (see FIG. 15), which in turn connect them to clevis members 18² on the end plates 14² of the evacuated bellows B² (see FIG. 15).

These bellows B² (see FIGS. 15 and 22) are mounted upon the fixed angle brackets or plates 312 and 313 on ends of the cylindrical casing 10².

The thermionic mechano-electronic transducer J² is mounted upon the arm 314 of the angle bracket 315. The angle bracket 315 in turn is mounted upon the base of the casing 10².

The angle bracket 316 (see FIG. 18) also is mounted on the base of the casing 10² by the foot 317 and it receives the threaded end 318 of the shaft 319, which carries the preloaded leaf spring 320. The tension on this preloaded leaf spring is adjusted by the nut 321.

The shaft 319 carries the channel member 322, to which at 322a are fastened the suspension metal strap 323. These suspension metal straps are mounted at 324 on the extension 325 on the member 36².

Extending downwardly from the member 325 will be a connection 325a to actuate the stylus of the transducer J².

At the extensions 328 of the member 36² there are connected the straps 332 which are mounted at one end at 327 and at their other ends at 329 on the bar 330. The lower bar 330 has a base 331 which is mounted upon the base of the housing or casing A².

As the lever Z² is rocked (see assembly in FIG. 18 and separated parts in FIG. 24) by the movement of the end plates 14² on the bellows B², this will cause rocking motion of the member 325 and actuation of the transducer J².

The ends of the lever Z² will carry the U-shaped clevis structures 525. The clevis structures 525 will have the jaws or legs 526 which will receive the ball bearing mounts 527 for the ends of the shaft 528. The shaft 528 carries the sleeves 529 through which projects the threaded rod 21², which is held in adjusted position by the nut 530.

The shaft 528 and the sleeve 529 will turn readily as the lever Z² rotates.

The restoration will be accomplished by the threaded member or lead screw 340, which is threaded in the movable members 341 and 342 associated with the mountings 24². This threaded member is driven by means of the intermeshing bevel gears 343 and 344 (see FIGS. 17, 20 and 21).

The bevel gear 344 is driven through the shaft 345 from the bevel gear 346 (see FIGS 16 and 17). The bevel gear 346 meshes with the bevel gear 347 on the shaft 348. The shaft 81² is connected to the pinions 259², which is driven by the small gear rod 257². The rod 257² is driven by the reduction gear mechanism associated with the servo motor HH².

The shaft 81² also drives the pinion 82². This pinion 82² meshes with and drives the large gear 83². Mounted to turn with the gear 83² is the cam 200². The central shaft 199² of the gear 83² and the cam 200² will ride in the slot 256² in the rack 202².

The rack 202² meshes with the gear 77² which in turn meshes with the gear 76² which drives the potentiometer 326². The lead screw 340 rides through an Oldham coupling 370, which in turn is mounted on the structure 371, which is mounted on the part of the frame structure 372 (shown in FIG. 17).

The Oldham coupling shown at 370 in FIG. 17 and in larger scale and separated in FIG. 25 has two end disks 510 and 511 which are mounted upon the ends 512 and 513 of the lead screw 340. The disk 518 is mounted by pins 514 and 515 and slots 516 and 517 between and on disks 510 and 511. These disks have the inwardly directed studs or pins 514 and 515 which fit into the slots 516 and 517 of the intermediate disks 518. The end structure 24² at the right of FIG. 17 is mounted on the ball slide 372, while the member 341 is mounted on the ball slide 373.

The slide structures are best shown in FIGS. 20 and 21 and there are shown the ball bearings 535 and 536, which are retained to ride along the groove guideways 537 and 538 and 539 and 540. These balls will be held as a unit in respect to the members 541 and 542, as shown in FIG. 21.

The connecting pins 543 and 544 will extend through the portions 545 and 546 into the end sleeves 547 and 548.

As shown in FIG. 20, the ends 555 of the spring k² will be connected at 556 to the pin 543.

The circuitry may be conveniently mounted in the housing section 374 (see FIG. 16).

Referring to FIG. 19, the cylindrical structure at the left and indicated by the numeral 399 may consist of a Mach meter while the electrical connections to the indicators and other mecahnism may be mounted at 400 on the central block 401. The louvres 402 and 403 will permit of ventilation while the opening 404 will provide a sealed window for testing purposes.

To summarize the operation of the device, the inputs to the instrument are static pressure P, free air temperature T and a manual setting for sea level static pressure $P_s$. The free air temperature T is computed electrically from a measurement of stagnation temperature $T_v$ and $f_T(M)$ the air temperature functional output of the Mach meter 399 which forms no part of this invention. Any suitable temperature measuring device may be employed. In the absence of an automatic temperature input, a manual setting can be used.

The electrical outputs are pressure altitude-temperature corrected H, vertical velocity $V_H$ and relative density $\sigma$. The relative density is supplied in FIG. 1 from an independent source from the meter or generating device or indicator indicated at the upper right of the figure to a junction with a mechanical connection 385.

The operating limits and accuracy are: $-500$ to $-80,000$ feet above sea level altitude$=(20-.004H)$; 750 ft./sec. clim and 1250 ft./sec. dive vertical velocity$=.75\%$; .02 to 1.05 density ratio$=50\%$.

The altimeter of the present invention is particularly unique in that:

(a) A sensitive and proportional mechano-electronic pickoff J is used for detecting small changes in static pressure.

(b) The instrument A will accept temperature as an input at coil D and correctly compensate static pressure measurements for changes in free air temperature.

The sensitive proportional pickoff not only allows the differentiation required for vertical velocity to be performed electrically but also allows the instrument to be stable at a much smaller differentiating time constant than is possible with instruments using less sensitive on-off pickoffs.

Appreciable reductions in size, weight and lag in measurement of vertical velocity are thereby achieved. It also makes possible a correction for lag with coil E in the static pressure line, which will also give complete compensation for servo motor time lag.

The temperature input at coil D allows automatic correction for change in air density with temperature and hence permits the measurement of pressure altitude temperature corrected.

Since these altitude increments must be integrated to obtain the altitude of the aircraft above a preset reference level the temperature corrections must be applied so as to cause a minimum variation in this constant of integration. The correction for temperature is accordingly applied against the reference afforded by a standard atmosphere with use of cam W.

The bellows B are evacuated and the enclosing space is connected to the static pressure line conduit 13. The spring and coil forces indicated at D, E and K are controlled in response to the error signal from the mechano-electronic pickoff J to hold the system continuously at equilibrium.

The temperature correction coil D receives electrical information to correct for the following departures of mean standard atmosphere, namely:

(1) The departure of sea level static pressure $P_s$ from the mean value $P_0$ designed in the cam.

(2) The departure of sea level free air temperature $T_s$ from the mean value of $T_0$ designed in the cam.

(3) The departure of temperature variation or lapse rate of the actual atmosphere from the mean standard lapse rate. The lapse rate is a measure of the temperature gradient in the atmosphere and is expressed in degrees per foot.

By the arrangement shown, it is possible to correctly compute the pressure altitude as a function of one variable, then by applying small corrections as functions of many variables a small compact accurate unit with only one servo motor HH will operate to make all the computations.

The correction coil D will provide corrections both for mean sea level pressure and for temperature.

In maintaining a torque balance in the casing A the springs are extended along a path which assures "astatism," that is, a change in pressure creates an unbalanced torque which is not opposed by the resultant motion of the springs K. This torque deflects the pickoff arm 57' of an electro mechanical transducer tube J' and generates a voltage proportional to this pressure change. Such proportional behavior permits full use of rate control with resultant high stability and negligible servo lag in the determination of vertical velocity and altitude.

With the use of free air temperature correction, readings of pressure altitude-temperature corrected are obtained rather than pressure altitude. The true vertical velocity is obtained.

In the absence of a temperature signal, pressure altitude may be obtained.

The box Relative Density in FIG. 1 may have a pointer on a dial directly driven by or from shaft 385 and the reading on said dial may directly give or be calculated to supply a relative density value of the air.

The unit can be readily built to fit in a case approximately 4¾" in diameter and 7 inches long, with about 35 cubic inches of space remaining for electrical circuitry.

In FIG. 9a there is shown an E-shaped transformer 500 which cooperates with the lever Z to create a varying output at 501.

A predetermined electrical power voltage is supplied at 502 to the outside coils 503 and 504 over to the ground 505.

The backward and forward reciprocation of the armature 506 with the movements of the suspended lever Z will give the error signal. By density altitude is meant temperature corrected pressure altitude in which the static pressure measurement is corrected by the temperature of the air and the mean standard atmospheric cam W, as shown in FIGS. 1, 11, 12 and 13, serves to compensate for the departure of sea level static pressure from the mean value and also for the departure of sea level free air temperature from the mean value.

It is apparent that many variations may be made in the system as described without departing from the essence of the invention as set forth in the appended claim.

Having now particularly described and ascertained the nature of the invention, and in which manner the same is to be performed, what is claimed is:

An altimeter having oppositely acting bellows in evacuated condition, a casing enclosing said bellows, a static pressure application including a conduit leading into the casing, said bellows being subject to the static pressure within the casing, said bellows having movable and fixed ends, the fixed ends being attached to the casing and said bellows being spaced apart and having their axes parallel, a lever having its ends connected to the movable ends of the bellows and having a frictionless center pivot, a movable plate vacuum tube transducer having its plate connected to the center of the lever so that the plate will move with movement of the lever, said movement of the plate generating an electric signal and a computer actuated by said electric signal to give a computed altitude reading.

References Cited by the Examiner
UNITED STATES PATENTS

| | | | |
|---|---|---|---|
| 459,977 | 9/1891 | Moller | 73—386 |
| 1,749,494 | 3/1930 | Luckey | 73—387 |
| 2,268,847 | 1/1942 | Rafferty | 73—179 |
| 2,277,625 | 3/1942 | Baynes | 73—178 X |
| 2,398,470 | 4/1946 | Shivers | 73—386 |
| 2,703,932 | 3/1955 | Norden | 73—387 X |
| 2,787,839 | 4/1957 | Taylor | 332—5.5 |

LEONARD FORMAN, *Primary Examiner.*

A. D. McFADYEN, LOUIS R. PRINCE, ISAAC LISANN, ROBERT B. HULL, *Examiners.*

A. MITCHELL, D. T. INNIS, *Assistant Examiners.*